United States Patent
Krishnan

(10) Patent No.: US 10,765,166 B2
(45) Date of Patent: Sep. 8, 2020

(54) HELMET WITH MECHANISM FOR COOLING

(71) Applicant: AptEner Mechatronics Private Limited, Bangalore (IN)

(72) Inventor: Sundararajan Krishnan, Bangalore (IN)

(73) Assignee: AptEner Mechatronics Private Limited, Bangalore (IN)

(*) Notice: Subject to any disclaimer, the term of this patent is extended or adjusted under 35 U.S.C. 154(b) by 46 days.

(21) Appl. No.: 15/899,378

(22) Filed: Feb. 20, 2018

(65) Prior Publication Data

US 2019/0021432 A1  Jan. 24, 2019

Related U.S. Application Data

(63) Continuation-in-part of application No. 15/655,927, filed on Jul. 21, 2017.

(30) Foreign Application Priority Data

Jan. 5, 2018 (IN) .............................. 201841000563

(51) Int. Cl.
*A42B 3/28* (2006.01)
*A42B 3/04* (2006.01)
(Continued)

(52) U.S. Cl.
CPC .......... *A42B 3/285* (2013.01); *A41D 13/0025* (2013.01); *A41D 13/0053* (2013.01);
(Continued)

(58) Field of Classification Search
CPC ......... A42B 3/285; A42B 3/286; A42B 3/283; A42B 3/281; A42B 1/24; A42B 1/008;
(Continued)

(56) References Cited

U.S. PATENT DOCUMENTS 2,875,447 A  3/1959  Goldmerstein
3,168,748 A * 2/1965  Limberg ................ A42B 3/286
                                                                    2/171.3

(Continued)

FOREIGN PATENT DOCUMENTS

CN       201420308788 U    12/2014

OTHER PUBLICATIONS

Giro,Edit Helmet, Source: http://www.evo.com/outlet/helmets/giro-edit-helmet-14.aspx , downloaded circa Sep. 9, 2016, pp. 1-12.
(Continued)

*Primary Examiner* — Amy Vanatta
(74) *Attorney, Agent, or Firm* — IPHorizons PLLC; Narendra Reddy Thappeta

(57) ABSTRACT

A headgear for protecting a user from head injury includes a helmet and a cooling unit. The cooling unit is designed to be attachable to, and detachable from, the helmet by the user during normal use of the headgear. In an embodiment, the cooling unit includes one or more inlets, a fan for drawing in air into the cooling unit via the one or more inlets, a pad to hold moisture to cool the air drawn into the cooling unit to generate cooled air, and an air outlet to direct the cooled air into said helmet.

8 Claims, 17 Drawing Sheets

(51) Int. Cl.
*A42B 1/00* (2006.01)
*F24F 5/00* (2006.01)
*A41D 13/002* (2006.01)
*A41D 13/005* (2006.01)
*A41D 27/28* (2006.01)
*A42B 1/24* (2006.01)
*F24F 6/04* (2006.01)

(52) U.S. Cl.
CPC ............. *A41D 27/28* (2013.01); *A42B 1/008* (2013.01); *A42B 1/24* (2013.01); *A42B 3/0406* (2013.01); *A42B 3/286* (2013.01); *F24F 5/0035* (2013.01); *F24F 6/04* (2013.01); *F24F 2221/38* (2013.01)

(58) Field of Classification Search
CPC .. A42B 3/0406; F24F 5/0035; F24F 2221/38; F24F 6/04; F24F 6/02; F24F 6/043; F24F 2006/046; A41D 13/0025; A41D 13/0053; A41D 27/28
See application file for complete search history.

(56) References Cited

U.S. PATENT DOCUMENTS

| | | | | |
|---|---|---|---|---|
| 3,391,407 | A * | 7/1968 | Waters | A42B 3/286 |
| | | | | 2/171.3 |
| 3,548,415 | A * | 12/1970 | Waters | A42B 3/286 |
| | | | | 2/171.3 |
| 3,813,696 | A * | 6/1974 | Yeager | A42B 3/286 |
| | | | | 2/171.3 |
| 3,881,198 | A * | 5/1975 | Waters | A42B 3/286 |
| | | | | 2/171.3 |
| 4,141,083 | A | 2/1979 | Waters | |
| 4,555,816 | A * | 12/1985 | Broersma | A42B 3/12 |
| | | | | 2/171.3 |
| 5,896,579 | A | 4/1999 | Johnson et al. | |
| 6,516,624 | B1 * | 2/2003 | Ichigaya | A41D 13/0056 |
| | | | | 62/259.3 |
| 6,954,944 | B2 | 10/2005 | Feher | |
| 6,973,676 | B1 | 12/2005 | Simpson | |
| 8,104,094 | B2 | 1/2012 | Uttrachi | |
| 8,156,570 | B1 | 4/2012 | Hockaday | |
| 9,241,529 | B1 * | 1/2016 | Danelski | A42B 3/286 |
| 2004/0074250 | A1 | 4/2004 | Junkins | |
| 2005/0278833 | A1 * | 12/2005 | Pierce | A42B 3/281 |
| | | | | 2/424 |
| 2008/0295220 | A1 * | 12/2008 | Webb | A42B 1/008 |
| | | | | 2/171.3 |
| 2009/0089908 | A1 * | 4/2009 | Huh | A61F 9/068 |
| | | | | 2/8.6 |
| 2011/0231977 | A1 | 9/2011 | Rupnick et al. | |
| 2013/0111651 | A1 | 5/2013 | Waters | |
| 2017/0215511 | A1 * | 8/2017 | Albani | A42B 3/24 |
| 2018/0103711 | A1 * | 4/2018 | Abrahamson | A42B 3/286 |
| 2019/0021433 | A1 * | 1/2019 | Goldwitz | A42B 3/286 |
| 2019/0150548 | A1 * | 5/2019 | Albani | A42B 3/283 |
| 2019/0191812 | A1 * | 6/2019 | Salem | A42B 3/286 |

OTHER PUBLICATIONS

All-weather motorcycle helmet heats and cools your face, protects grey matter (video), Source: https://www.engadget.com/2012/08/21/all-weather-motorcycle-helmet-heats-and-coolsyour-face-protect/, downloaded circa Sep. 17, 2016, pp. 1-1.
Bicycle Helmet Cooling, https://www.helmets.org/cooling.htm, downloaded circa Sep. 16, 2016, pp. 1-6.
International Search Report and Written Opinion dated Jun. 21, 2018 from International Application No. PCT/IB2018/051096, 10 pages.

* cited by examiner

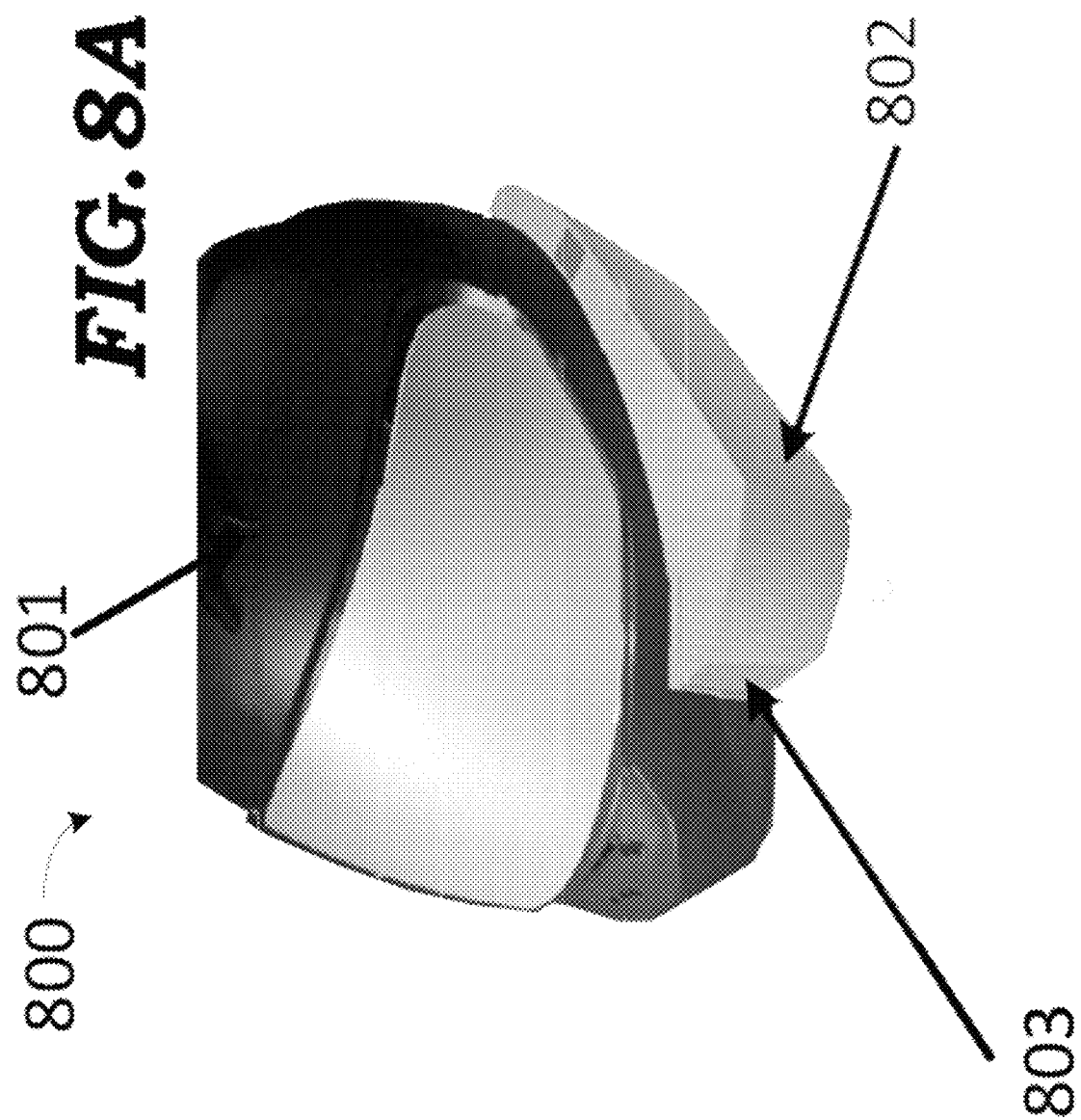

811a  811b

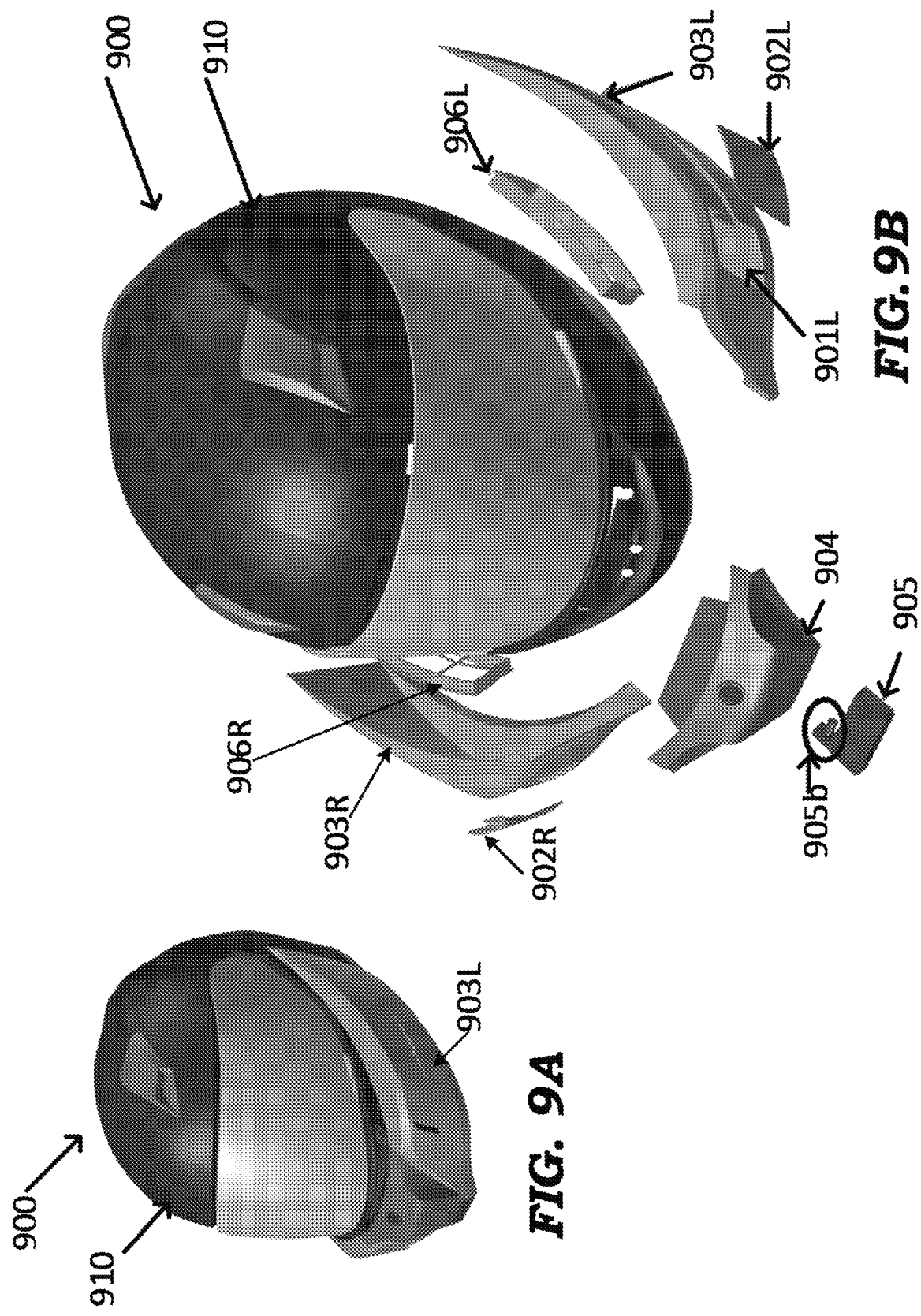

HELMET WITH MECHANISM FOR COOLING

PRIORITY CLAIM AND RELATED APPLICATION

The instant patent application is a continuation-in-part of, and claims priority from, co-pending US Patent Application entitled, "Helmet with Mechanism for Cooling", application Ser. No. 15/655,927, Filed: 21 Jul. 2017, naming Sundararajan Krishnan as the inventor, and is incorporated in its entirety herewith, to the extent not inconsistent with the content of the instant application.

The instant patent application claims priority from co-pending India Patent Application entitled, "Helmet with Mechanism for Cooling", Application Number: 201841000563, Filed: 5 Jan. 2018, naming Sundararajan Krishnan as the inventor, and is incorporated in its entirety herewith, to the extent not inconsistent with the content of the instant application.

BACKGROUND

Technical Field

Embodiments of the present disclosure relates to a helmet and more specifically to a helmet with mechanism for cooling.

Related Art

Helmets are worn to protect heads of humans. Helmets are often seen worn by riders of vehicles and people working in industries such as construction, manufacturing, etc. In general, when worn, helmets protect persons wearing a helmet from injuries to the head.

The adoption of protective helmets is significantly inhibited by the discomfort experienced in using them. Factors such as excessive sweat and hair loss tend to override the safety benefit achieved by wearing a protective helmet. Reducing the discomfort caused by sweat can considerably enhance adoption.

Research studies have shown that ventilation is effective when the air temperature is lower than the body temperature. At higher ambient temperatures, ventilation has a detrimental effect on thermal comfort. Aspects of the present disclosure are directed to helmets which provide cooling effect to heads of persons.

BRIEF DESCRIPTION OF THE DRAWINGS

Example embodiments of the present disclosure will be described with reference to the accompanying drawings briefly described below.

FIGS. 8A-8F are diagrams illustrating the details of a cooling mechanism in another embodiment of a helmet according to the present disclosure.

FIGS. 9A-9C are diagrams illustrating the details of a cooling mechanism in yet another embodiment of a helmet according to the present disclosure.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
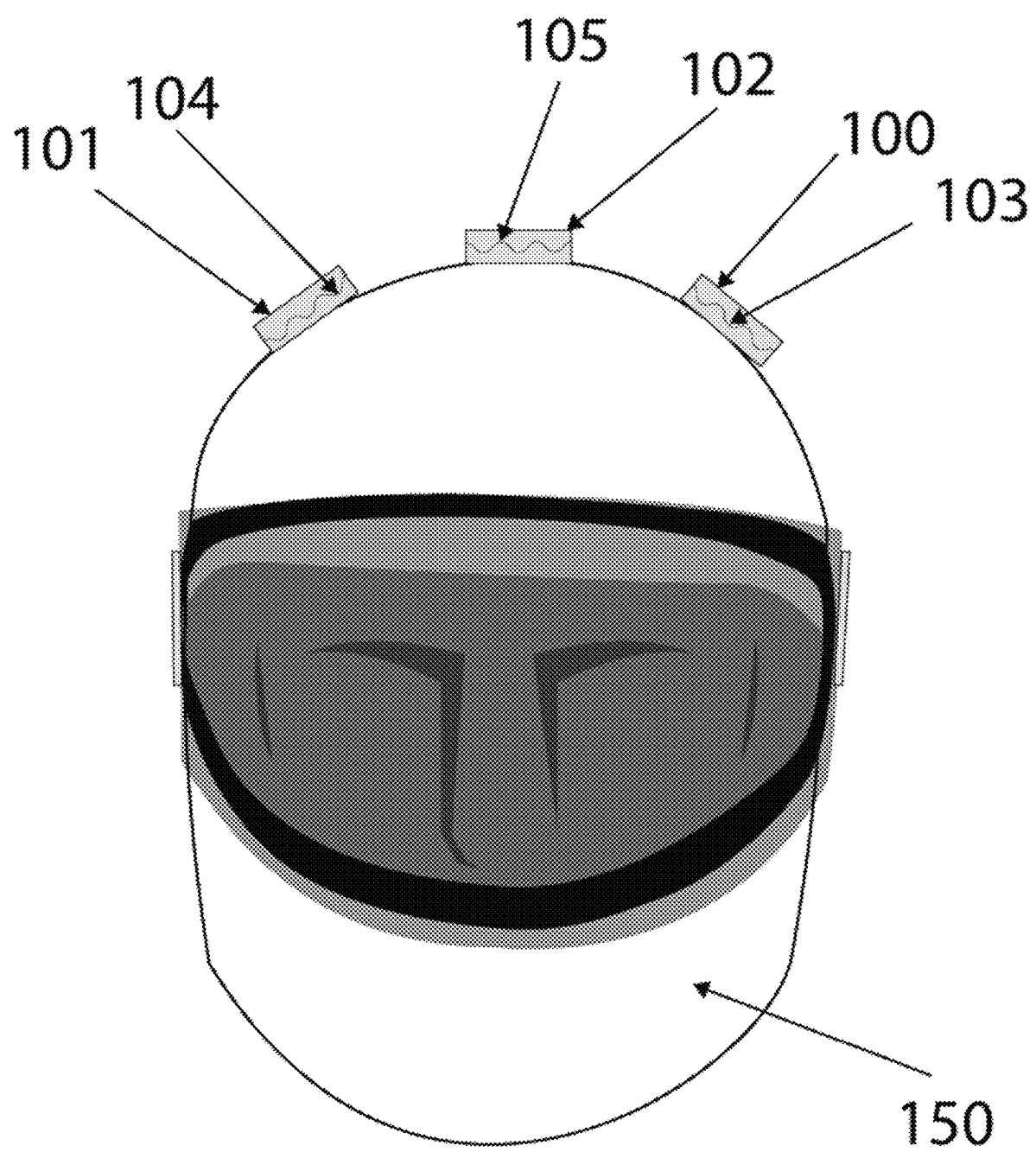
FIG. 1 shows the front-view of a helmet, in an embodiment of the present disclosure.

A headgear for protecting a user from head injury includes a helmet and a cooling unit. The cooling unit is designed to be attachable to, and detachable from, the helmet by the user during normal use of the headgear. In an embodiment, the cooling unit includes one or more inlets, a fan for drawing in air into the cooling unit via the one or more inlets, a pad to hold moisture to cool the air drawn into the cooling unit to generate cooled air, and an air outlet to direct the cooled air into said helmet.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Helmet

An aspect of the present disclosure improves the adoption of protective helmets is thermal comfort. In hot weather, and more severely in hot and humid conditions, factors such as excessive sweating and concomitant hair loss tend to override the safety benefit of wearing the helmet.

The impact of ventilation on thermal comfort has been studied in detail by research groups. One of their key findings has been that it is possible to design the helmet in such a way that the air flow within the helmet is significantly improved leading to increased forced convection. However, this approach works only if the ambient temperature is lower than the body temperature. This is easy to visualize as the body heat will not be removed by the incoming air through convection if it is going to be at a higher temperature than the body's temperature. In fact, it has been corroborated by researchers that ventilation has a detrimental effect when the ambient temperature is higher than the body temperature. One can visualize then a curve plotting ventilation comfort versus ambient temperature and expect that the cross-over point for this curve (where ventilation goes from being beneficial to detrimental) would be close to the point where the ambient temperature is close to the normal body temperature. We can hence conclude that ventilation by itself is not an appealing solution given that peak temperatures in summer can be several degrees above the body temperature. If we could somehow lower the temperature of the air that comes in contact with the face/head of the user relative to the body temperature, we could then improve the cross-over point for the aforementioned curve. For example, lowering the temperature of the incoming air by 10 degrees would mean that having vents in the helmet will provide thermal comfort for the user until ambient temperatures that are 10 degrees higher than the body temperature.

If the user is on a moving vehicle (bicycle, motorcycle), the wind flow associated with the vehicle's motion will behave like a fan (or a pump, in general) and push air into the vent. If the user is stationary (example, industrial safety helmet or a motorcyclist waiting at a signal), a separate fan can serve the purpose of sucking in air at a reasonable velocity to aid forced convection.

FIG. 1 shows the front-view of a helmet 150 in an embodiment of the present disclosure. In the embodiment, helmet 150 is designed to have a tough outer shell (406 in FIG. 4) and a soft inner shell (200 in FIG. 2), and is shown including vents 100, 101 and 102 and cooler pads 103, 104 and 105. Vents 100, 101 and 102 serve as inlets for air to flow from the outside of the helmet into the helmet. Only three vents and three corresponding cooler pads are shown in the interest of clarity. In general, the shape, location and number of vents can be different from that shown in FIG. 1. The vents may be created by cutting-out corresponding portions of the inner shell and outer shell. Cooler pads 103, 104 and 105 may be attached by suitable means to an inner surface of helmet 150. For example, a cooler pad may be disposed in an air pathway (created as described below) between the corresponding vent and the head of the wearer. The mechanism for moistening the cooler pads is not shown in FIG. 1. However, the moistening could be done either through a manual water-spray arrangement or through a wick/pipe attached between the reservoir and the cooler pad, for example, as illustrated below with respect to FIG. 6. The reservoir can be filled with liquid (e.g., water) for the purpose of cooling. A pump can be used to push the liquid to the pad via the pipe. Alternatively, the movement of the liquid to the cooler pad can be entirely due to capillary action, without requiring a pump. The moistening of the pad can be regulated either by monitoring the temperature of the cooled air or through a simpler timer circuit or by a combination of the two.

The incoming air is channelized into vents 100, 101 and 102. This may be accomplished either by the user being in motion (in the case of a bicycle/motorcycle, for example) or by any type of suction mechanism. For example, a fan/pump can be attached to, or proximal to, the vent (in the case of a relatively stationary user such as someone using a safety industrial helmet). The air flowing into the vent cools down due to evaporation from the moist cooler pads. The direction of the vent can be such that the cooled air flows in a direction tangential to the head grazing the top of the forehead.

Figure 2:
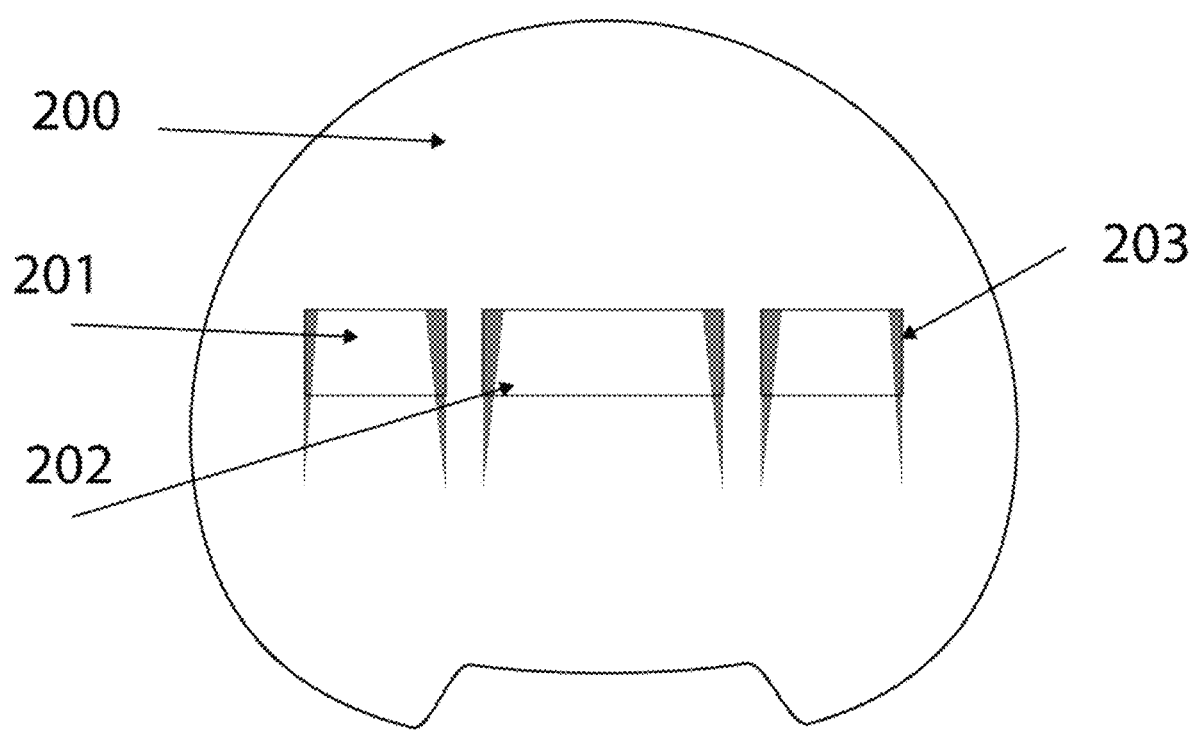
FIG. 2 shows the front view of the inner shell of a helmet, in an embodiment of the present disclosure.

FIG. 2 shows the front view of the inner shell 200 of helmet 150 with the cutouts 201, 202 and 203 being provided to align with vents 101, 102 and 100 respectively.

Figure 3:
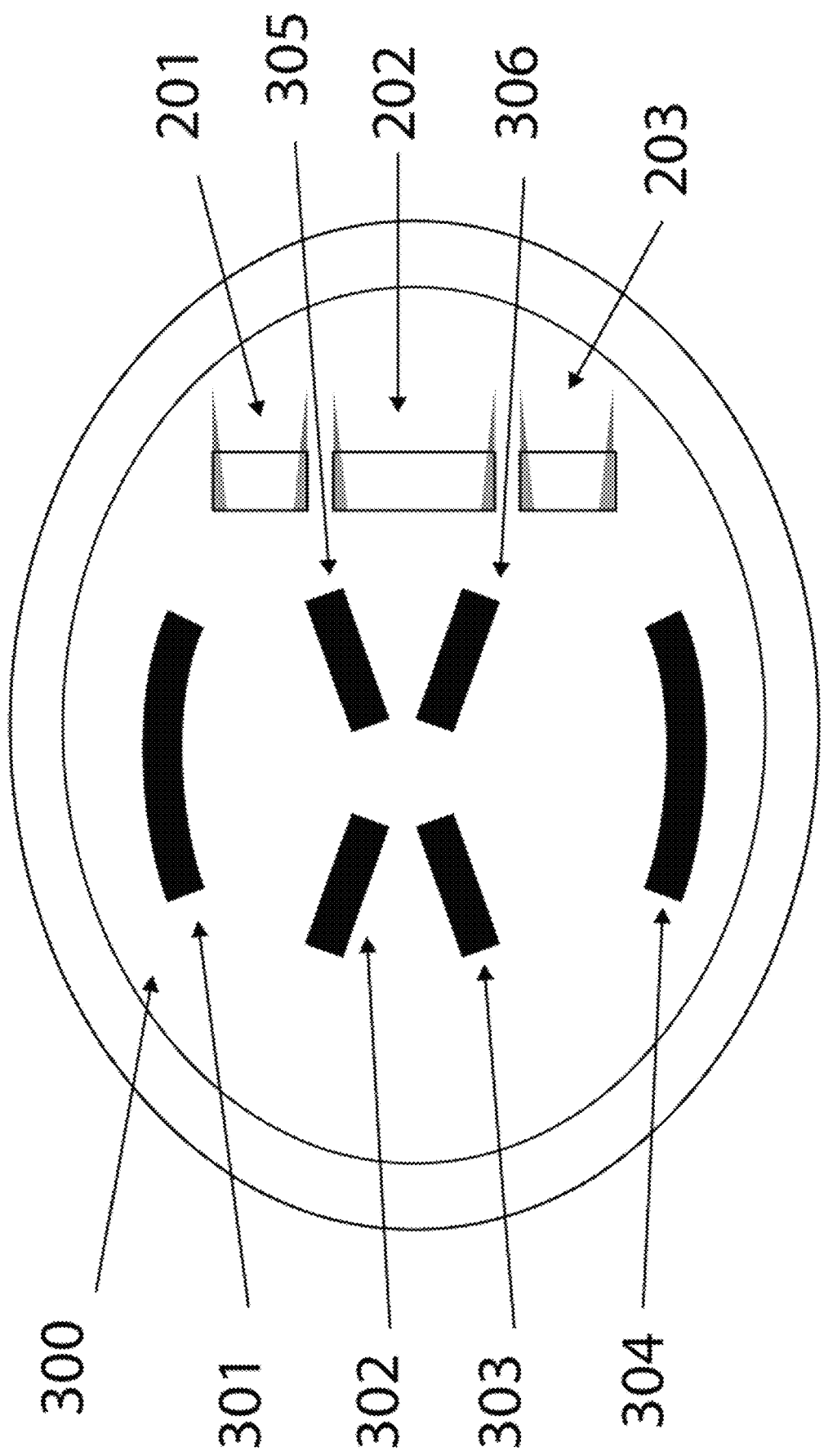
FIG. 3 shows the bottom view of the inner shell of a helmet, in an embodiment of the present disclosure.

FIG. 3 shows the inner surface 300 of the inner shell 200 of helmet 150, and is used to illustrate the manner in which "air pathways" are created inside the helmet to improve ventilation. The ventilation system (shown in FIG. 3) of the helmet is designed in a way that the inner shell 200 of helmet 150 is elevated with respect to the head of the wearer of the helmet to create air pathways between the top of the head of the wearer and the inner surface 300 of inner shell 200. Elements 301, 302, 303, 304, 305 and 306 are stoppers or pillars attached to the inner surface 200 to create air pathways between the head and inner shell 200. The number of pillars and their locations are shown merely by way of illustration, and more or fewer pillars may be are distributed across the inner shell 200 of the helmet in a way that they do not interfere with the flow of air over the top of the head of the wearer. Since the air temperature has now been reduced (due to the moist air), there is heat removal from the head through forced convection.

Figure 4:
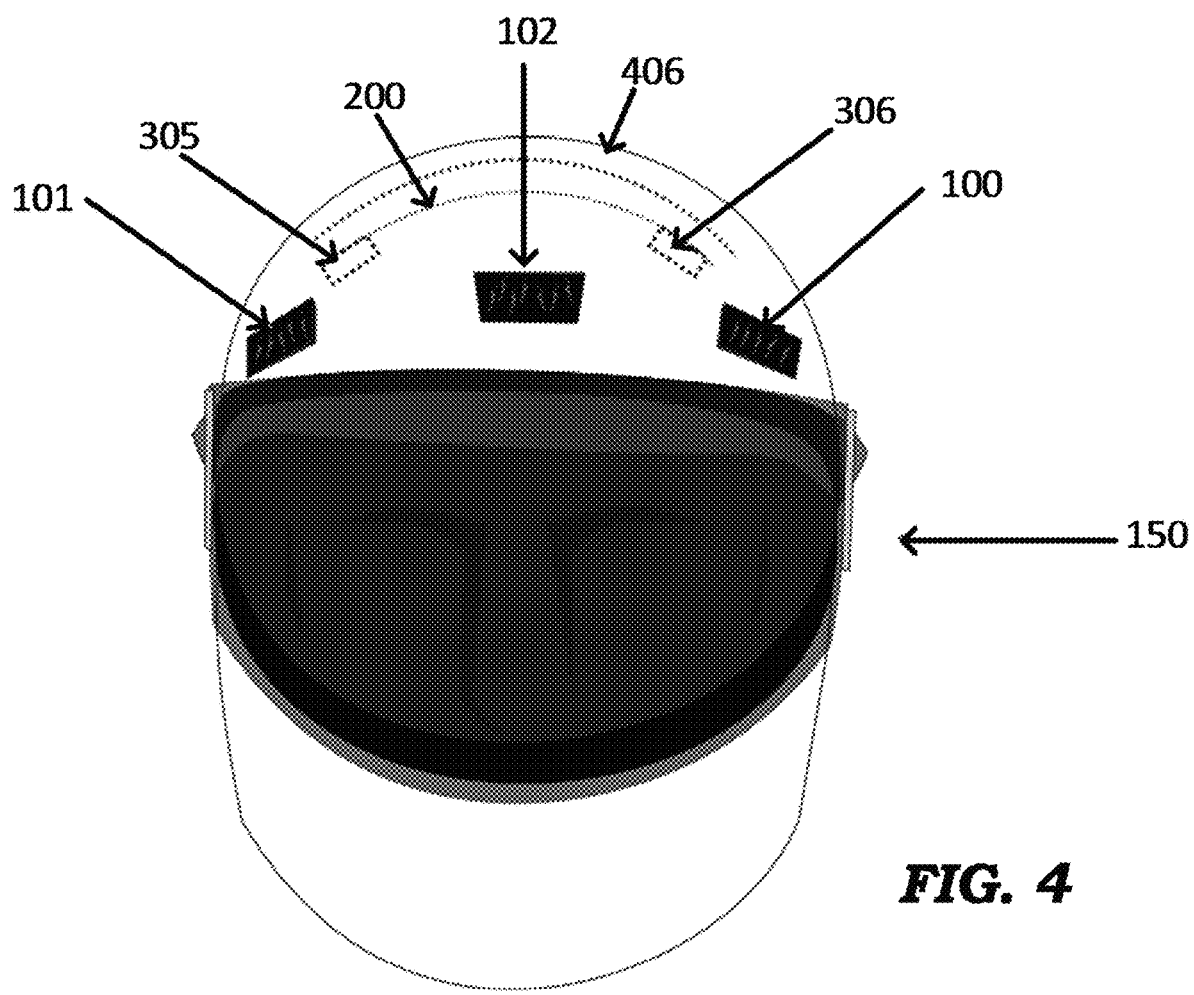
FIG. 4 shows the front-view of a helmet showing some details of internal components, in an embodiment of the present disclosure.

FIG. 4 shows the front-view of helmet 150 with more details than in FIG. 1. To aid understanding, the inner layers of the helmet are shown in dotted lines in FIG. 4. Elements 100, 101 and 102 are vents that are filled with moist air-cooler pads (as described above with respect to FIG. 1). Surface 406 represents the outer shell of the helmet and may be made of a material such as ABS (Acrylonitrile Butadiene Styrene) or carbon fiber. Surface 200 represents the inner shell of the helmet and may be made of a material such as EPS (Expandable Poly Styrene). Elements 305 and 306 are the stoppers/pillars also shown in FIG. 3. It is to be understood that materials noted herein are commonly used in helmets. The cooling techniques described herein do not have any dependence on such materials, and helmet 150 can use other materials for the inner shell 200 and outer shell 406. The scope of the disclosure also can be extended to any other similar designs of the protective helmet, without restriction to the particular design of the protective helmet shown in FIGS. 1-9.

As noted above, stoppers/pillars separate the rider's head from the inner shell 200. As a result, pathways (or passages) for air to flow inside the helmet are created. This is illustrated further with respect to the side/cross-section view shown in FIG. 5. As was done in FIG. 4, FIG. 5 superimposes some cross-sectional view aspects (in dotted lines) over the side-view of helmet 150. Elements 100 and 102 are the vents shown in FIG. 1. Surface 300 represents the inner surface of the inner shell 200.

Figure 5:
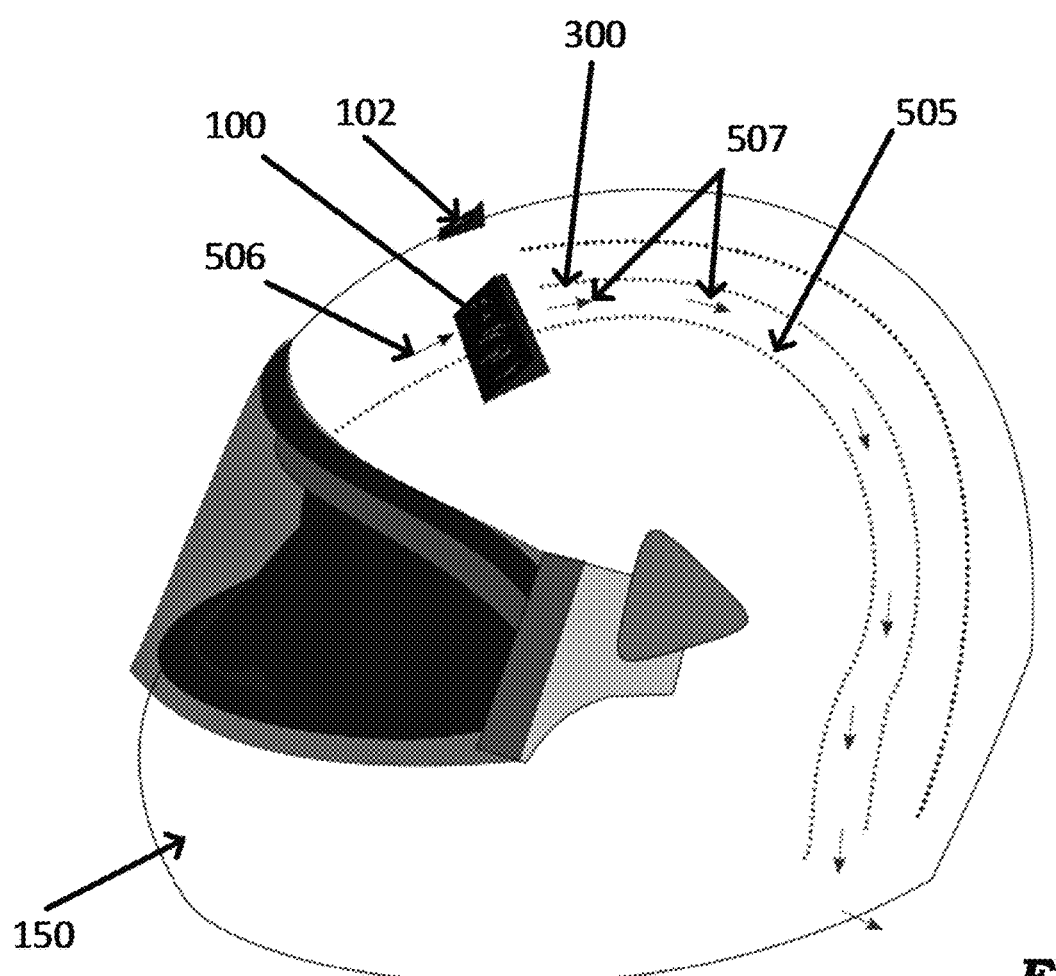
FIG. 5 shows a side cross-sectional view of a helmet illustrating air flow achieved within the helmet, in an embodiment of the present disclosure.

Arrow 506 represents the air at ambient temperature that flows into vent 100 while arrows 507 represent the cooled air coming out of cooler pad 103. Cool air 507 flows in the space between the head of the wearer and the inner shell. The head and the inner shell come in contact in places where the stoppers/pillars are located, and the cross-sectional view shown here is intended to show the flow of air in the region/space created between the head and the inner shell. As cooled air 507 flows over the surface of the head, it removes heat from the wearer's body. In FIG. 5, cooled air is shown exiting through the lower-back of the helmet. Although not shown, vents can be created at the back/lower-back of the helmet to facilitate the exit of cooled air.

The heat removed through forced convection is dictated by the following formula:

$$Q = h\Delta T,$$

Wherein,

Q is the heat removed/unit time/unit area in Watts (W), h is the convective heat transfer co-efficient, $\Delta T$ is the temperature difference between the air and the head.

The convective heat transfer co-efficient 'h' depends on the physical properties of the fluid and the physical situation. In this case, the fluid is air, and the physical situation is determined by the distribution of air across the helmet. Creating the air-passage ensures that the convective heat transfer co-efficient is maintained adequately high. A positive (and substantial) temperature difference ($\Delta T$) may achieved through the technique of lowering the air temperature by using the moist cooler pads.

The convective heat-transfer co-efficient of air is approximately 25 W/m^2K (wherein m^2 is the unit area and K is the temperature difference in Kelvins) when the air velocity is 3-4 m/s. A medium driving speed of 25-30 km/h will result in such an air velocity inside the helmet. With a ΔT of 5 degrees Celsius, the heat removed by the techniques described herein can be as much as 125 W/m^2. In comparison, the heat dissipated by the human head is approximately 80 W/m^2. The amount of water (or liquid in general) required for the cooling techniques described herein is very little. Experiments and calculations show that 10 ml (milli liters) of water may be needed every 15 minutes. This means that a water reservoir of 100 ml can provide cooling for a 2.5-hour ride.

Figure 6:
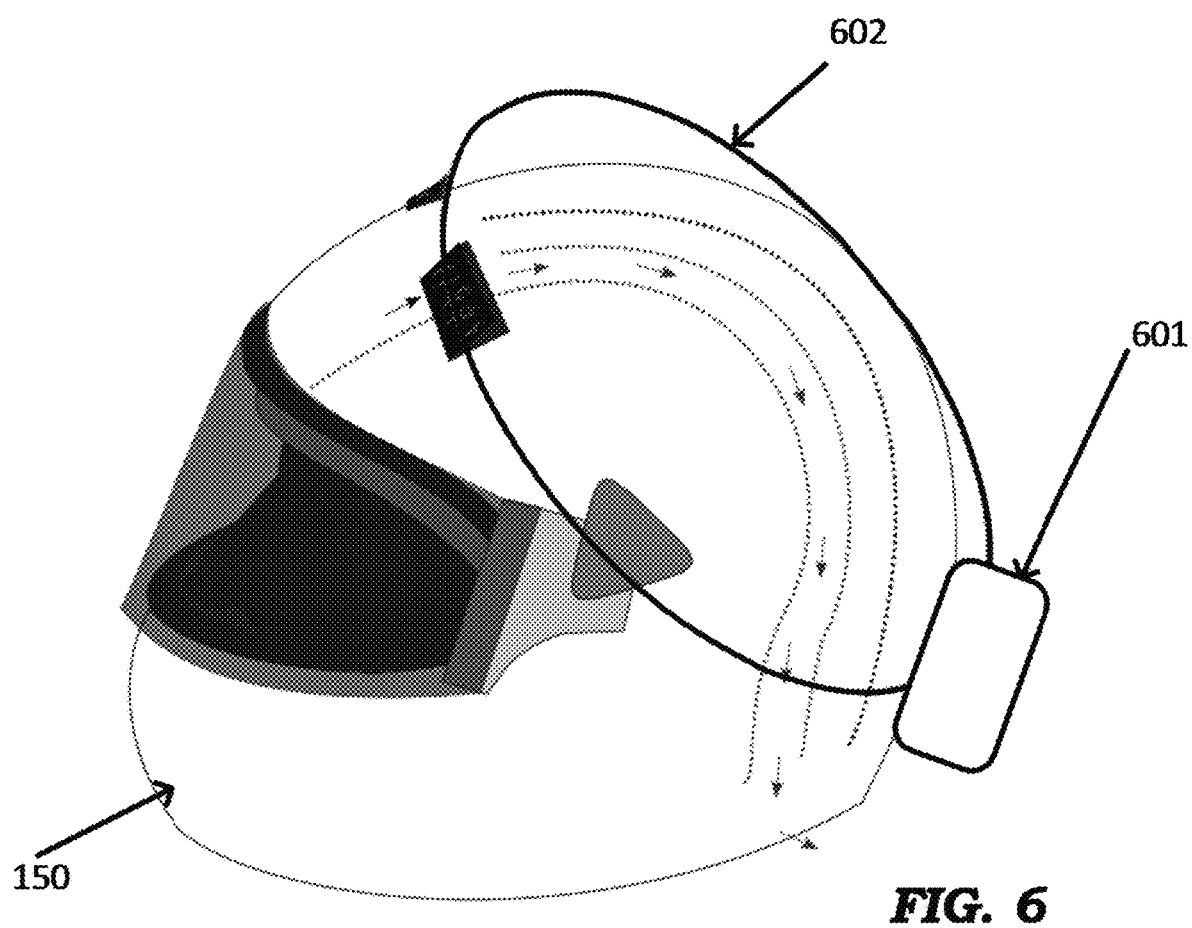
FIG. 6 shows an example arrangement for moistening air cooler pads in a helmet, in an embodiment of the present disclosure.

FIG. 6 shows an example technique (shown conceptually) for moistening the air cooler pads of helmet 150. A water (or liquid, in general) reservoir (part 601) is provided at the back of the helmet (although the reservoir can be technically placed elsewhere close to the helmet) and the water is distributed either through wicking (capillary action) or through piping. Element 602 represents a channel for flow of liquid, and can be either a wick that transports water or piping/tubing for the water to flow. The rate of water flow needed is extremely low given that the rate of water consumption for cooling is about 10 ml every 15 minutes. A simpler solution of using a hand-spray that sprays water on the cooler pads on a need basis can also be used. Alternatively, the temperature inside the helmet can be monitored and the flow of liquid regulated by using an electronic control circuit and a pump (not shown), as would be apparent to one skilled in the relevant upon reading the disclosure herein.

Although the techniques described herein are in the context of helmets, such techniques can be easily extended to other wearables such as any type of headgear including caps, as well as clothing.

Figure 7:
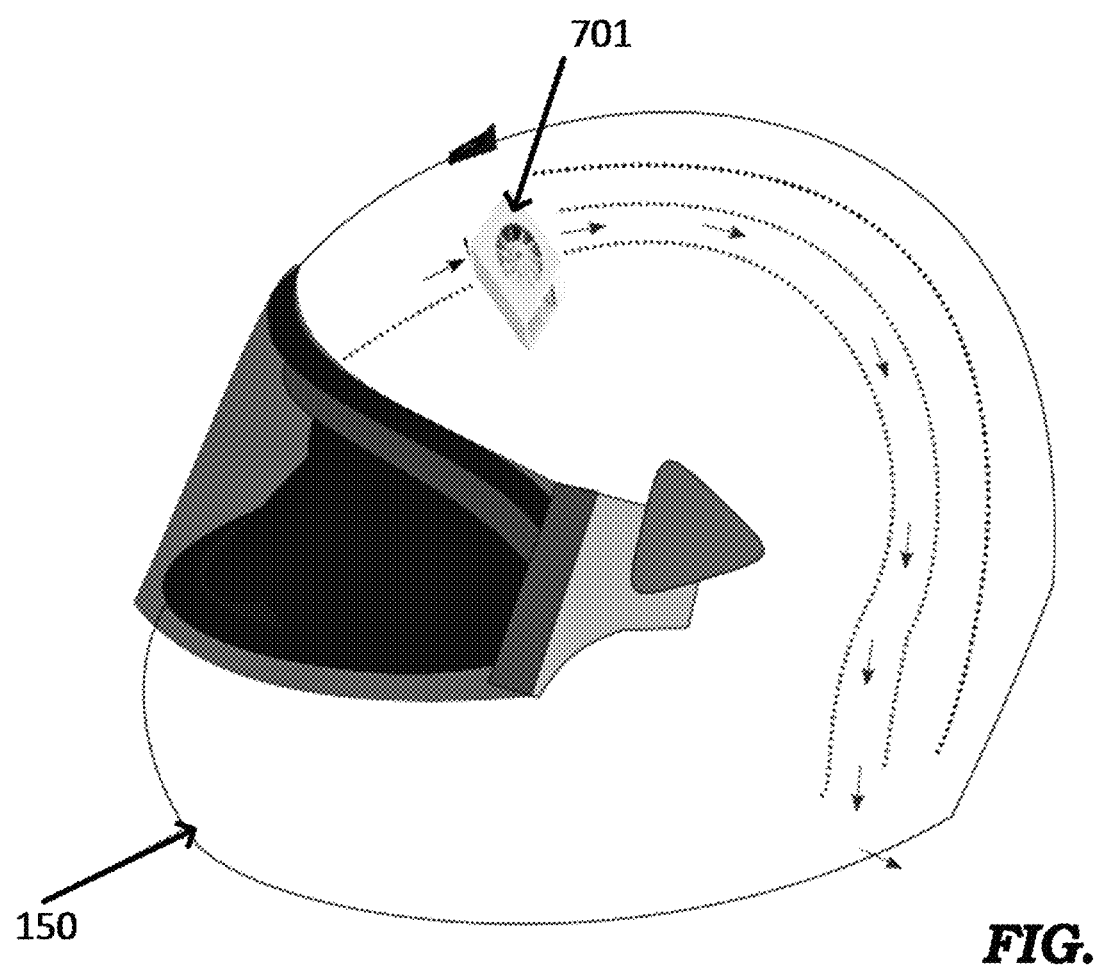
FIG. 7 shows an example arrangement in which a fan is used in a helmet, in an embodiment of the present disclosure.

In an alternative embodiment, mini fans or mini blowers are provided close to the vents to ensure air flow at sufficient velocity. Such a solution is useful when the wearer is stationary most of the time. Extremely small form-factor fans/blower such as the ones used in portable electronics can be easily fitted on top of the vents ensuring that this cooling technique is usable for mobile or stationary users. FIG. 7 shows an example embodiment wherein a fan/pump 701 is placed flush with the vent. Fan 701 forces air to flow into the vent even when the person is stationary causing cooled air to flow over the head of the person ensuring that heat is removed from the head. A mini-blower can also be used instead of fan 701.

FIGS. 8A through 8F illustrate an embodiment of a helmet 800 in which the entire cooling mechanism (contained within attachment 802) is externally attachable to the shell of the helmet. Helmet 800 is shown containing shell 801 and external attachment 802. Shell 801 refers to the portion of helmet 800 other than the external attachment 802, and contains an outer shell and an inner shell, just as in helmet 150 of FIG. 1. The cooling mechanism in helmet 800 is similar in principle to that described above with respect to helmet 150. Attachment 802 contains an opening (inlet for air) covered by a movable flap 803 to regulate the air flow into portion 802 (the extent of opening of flap 803 determining the volume of air that will flow in), an optional fan/pump 804 that pulls in air from the ambient and forces the air towards cooler pad 806, cooler pad 806, reservoir 807 (with lid 807b) to hold water/liquid that is used to wet the cooler pad 806 and an outer cover 805. Cooler pad 806 is wetted by using a wick 808 that is immersed in the reservoir 807 at one end and is in contact with cooler pad 806 on the other end. Wick 808 transports water from the reservoir to the cooler pad through capillary action. The surface area of contact between the wicking material and the air cooler pads can be increased by employing a ring shape for the wicking pad, with the cooler pad placed inside and in contact with the ring. The temperature inside the helmet can be monitored and the flow of liquid regulated by using an electronic control circuit and a pump (not shown).

In operation, external air flows into attachment 802, through the moist air-cooler pad 806, loses heat, and cools down. This cold air is then further pushed into the helmet with the helmet appropriately modified for ease of air flow. An opening 809 in shell 801 cutting all the way to (and including) the EPS layer (i.e., inner shell in shell 801) creates a flow path for the cold air. Grooves 810 (FIG. 8E) and 811a and 811b (FIG. 8F) in the inner shell are used to circulate the air over the head and face region, and represent "air pathways". Groove 810 creates a flow path for the cool air in a direction going upward from the cheek towards the forehead, while grooves 811a and 811b create flow paths over the scalp heading towards the forehead region.

Figure 8B:
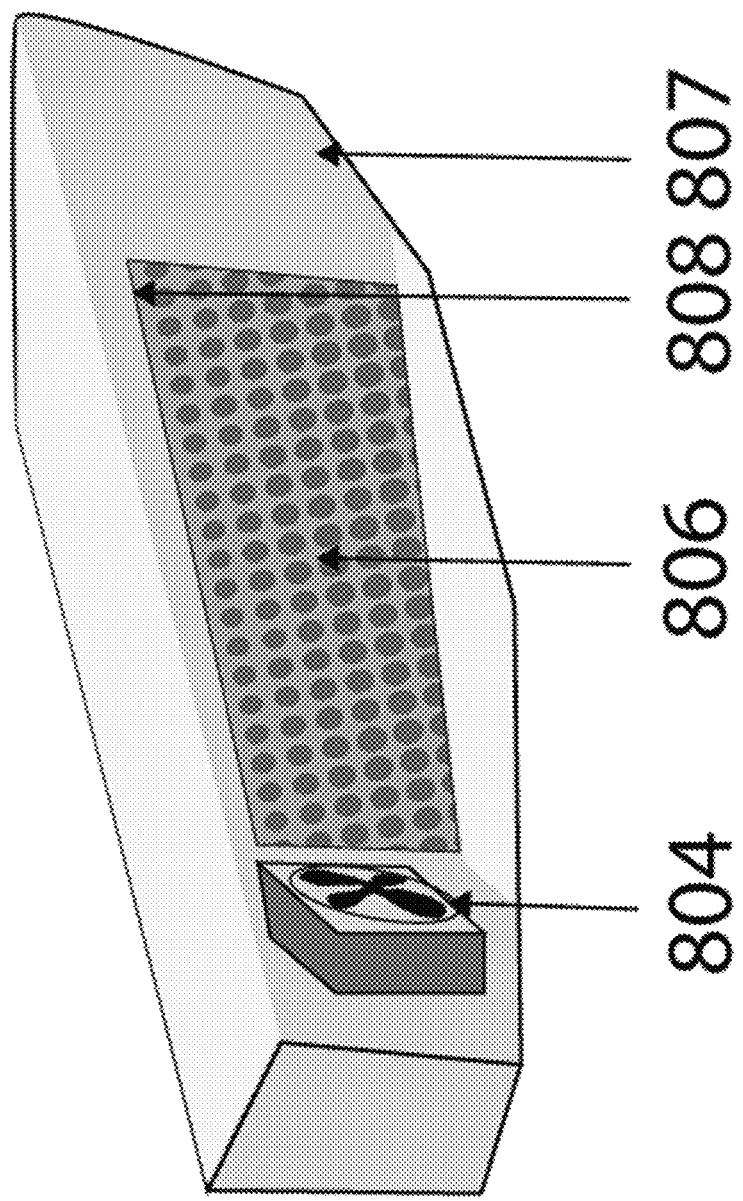
Figure 8C:
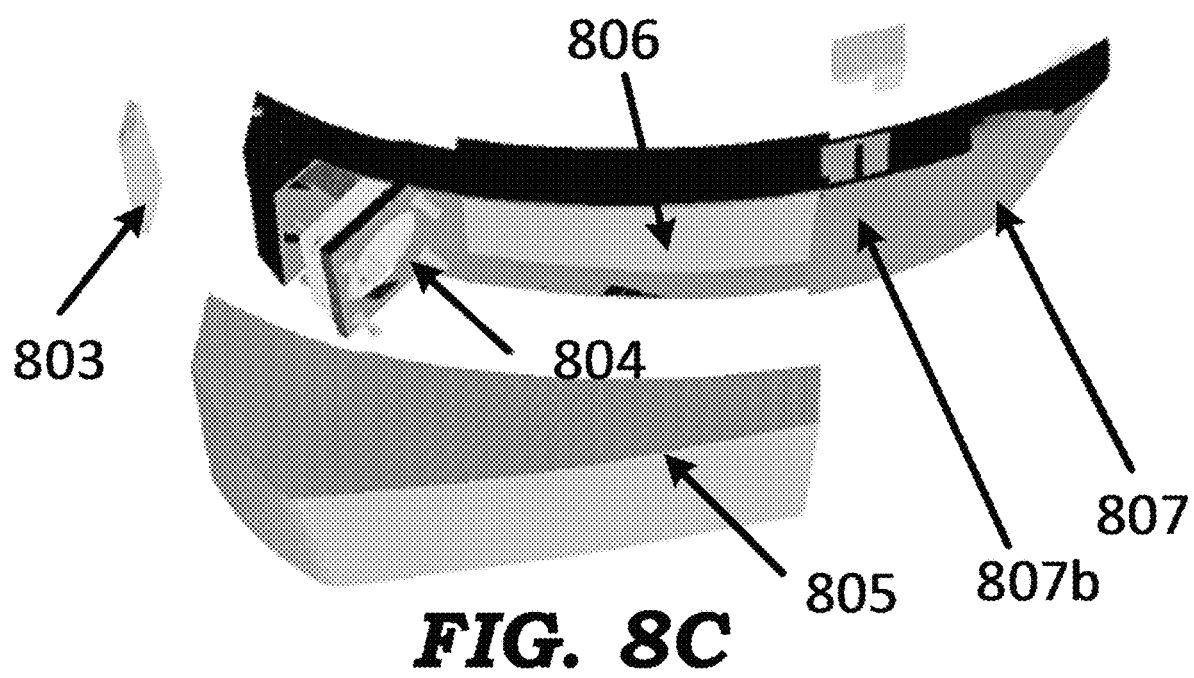
Figure 8D:
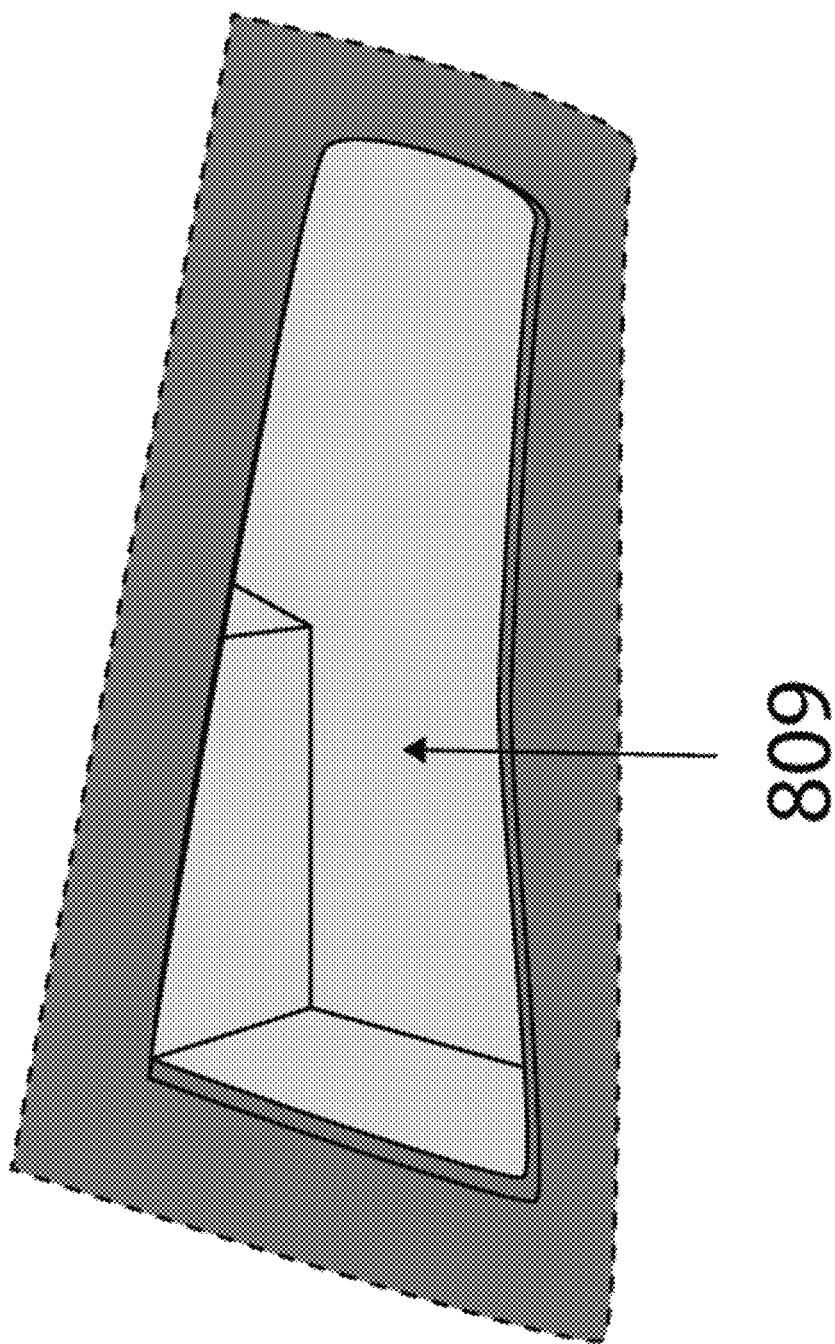
Figure 8E:
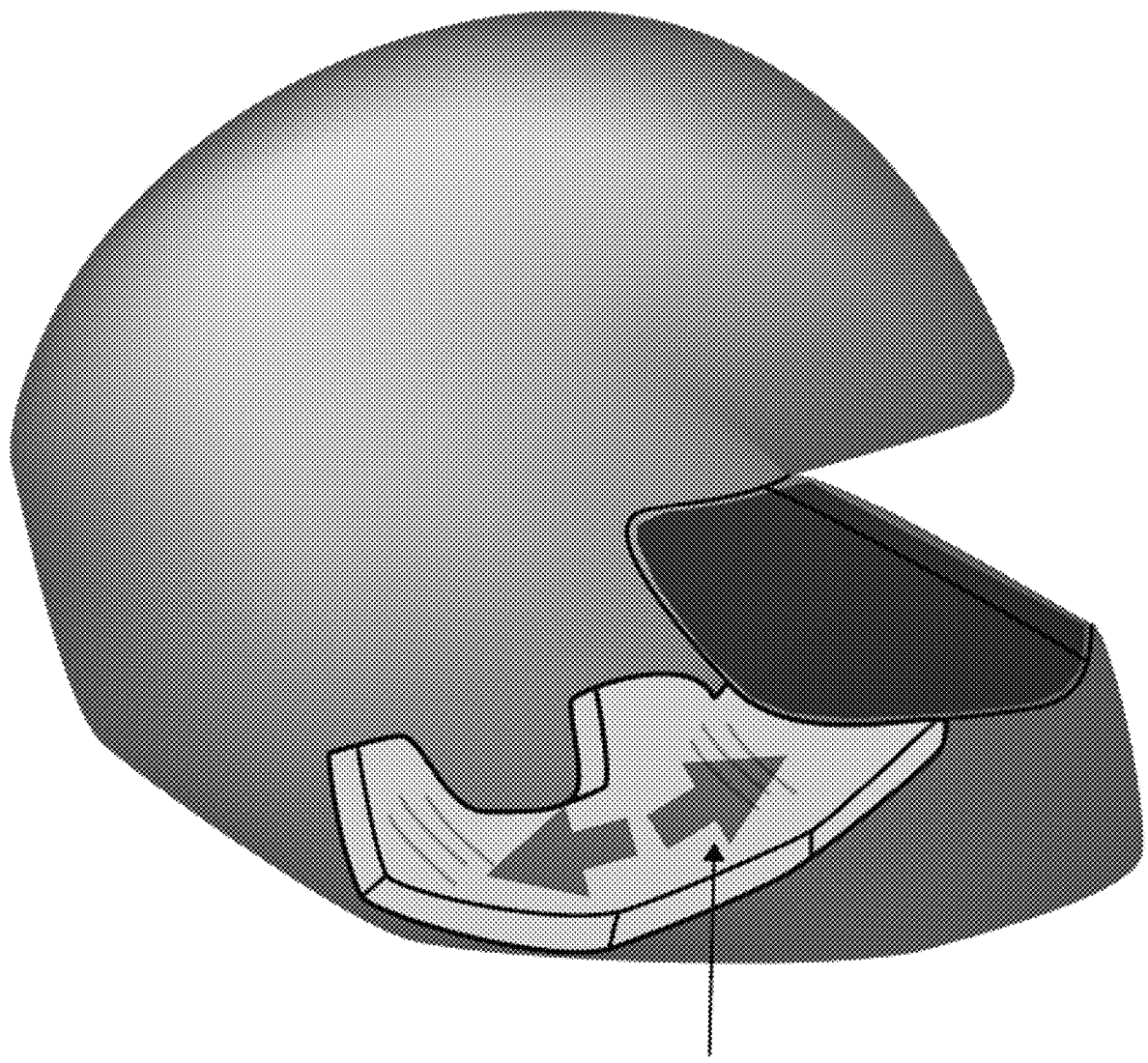
Figure 8F:
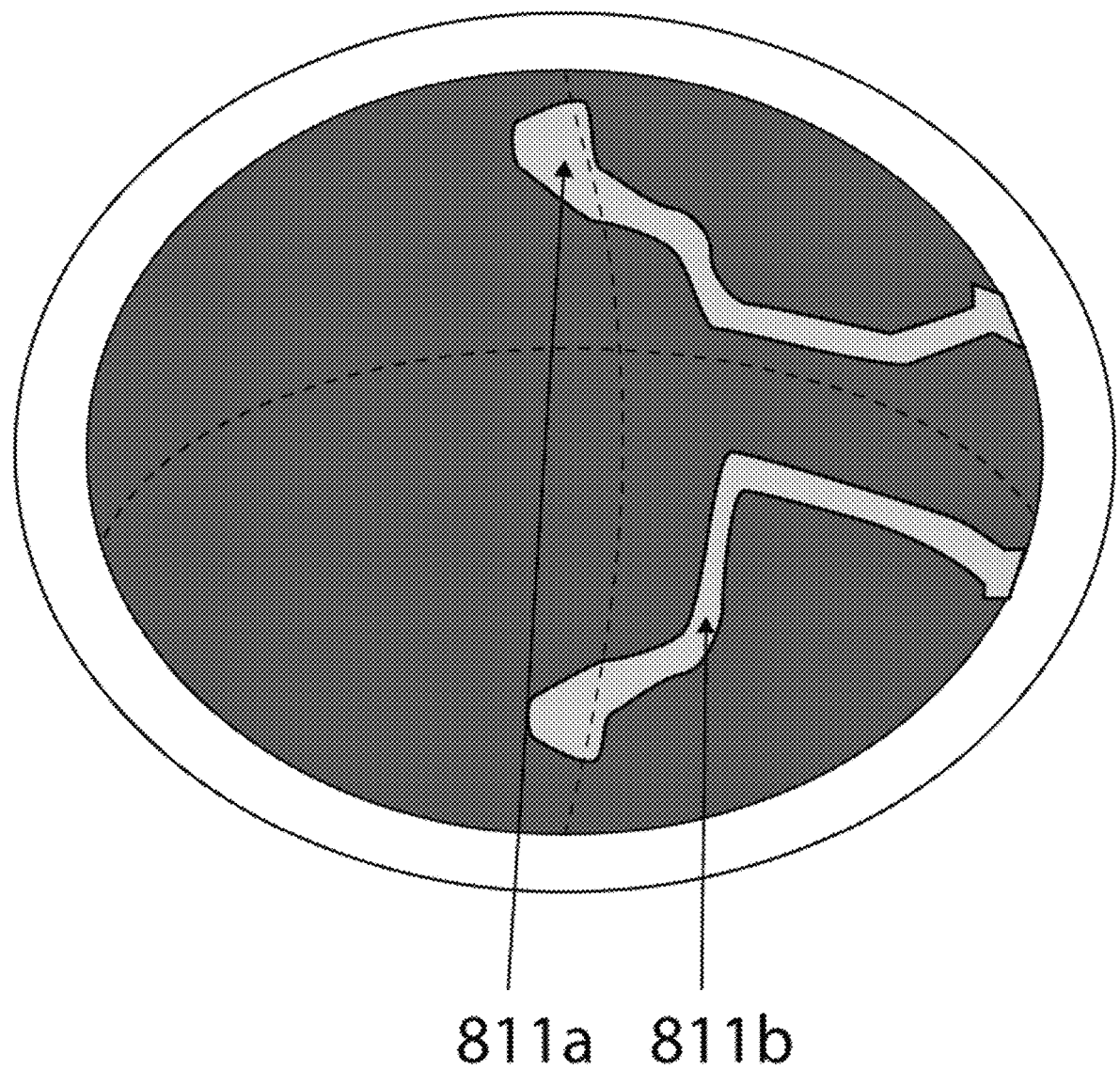

Alternative to use of a wicking material, a pump (not shown) can be used to force the liquid in reservoir 807 to flow to the air cooler pad 806. Although only one attachment 802 is shown in FIG. 8A, more than one such attachment can be used, for example on either side of helmet 800. Cool air can exit via natural gaps that are present between the head of the wearer and the helmet, for example near the chin area. Although shown to contain a fan, an alternative embodiment does not have the fan, and depends on natural air flow for its operation. Again, although described in the context of a helmet, the technique illustrated in FIGS. 8A-8F can be implemented in any wearable such as a safety/industrial/military/sports helmet or other gear like caps, gloves and jackets.

Figure 9C:
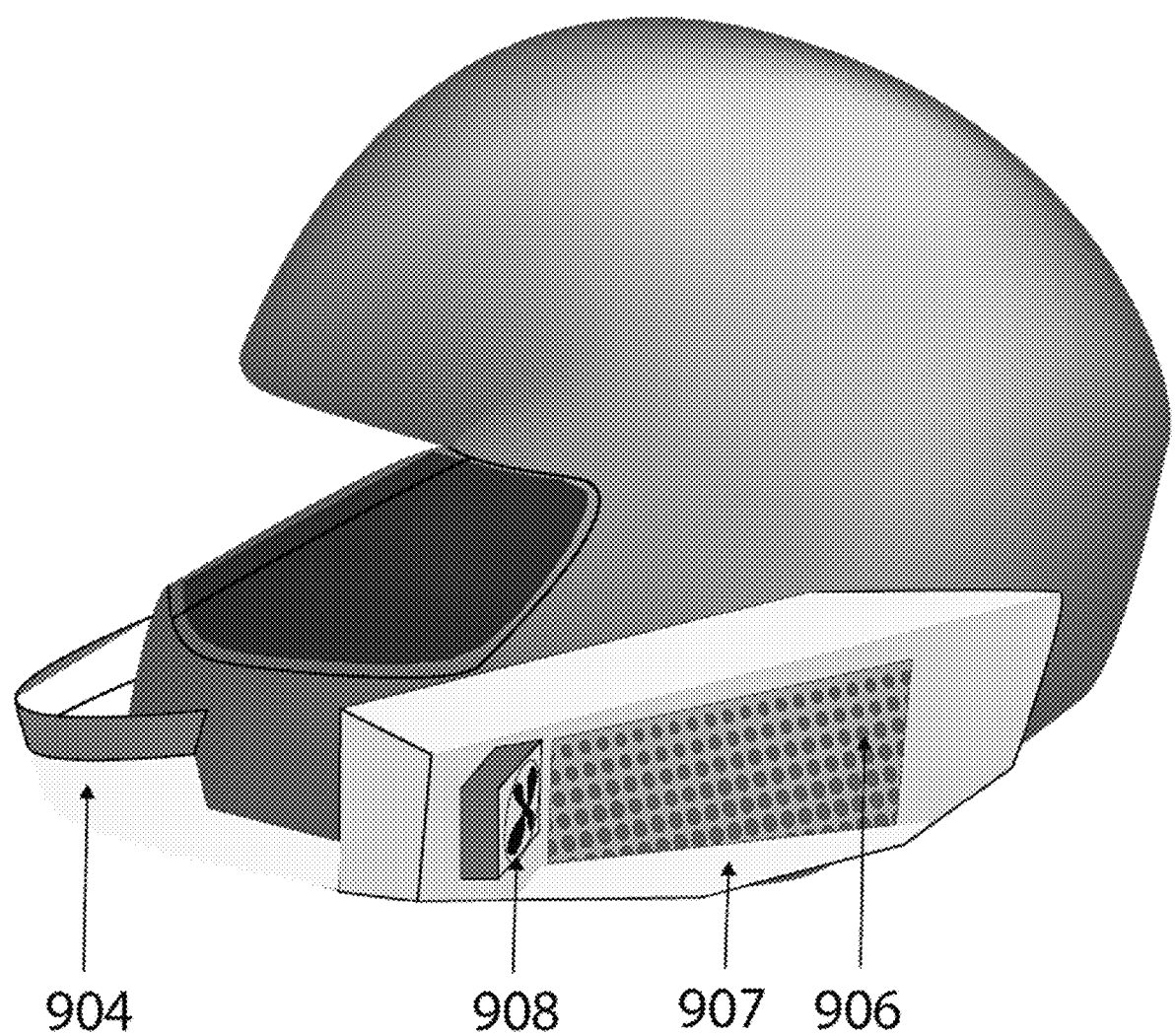

FIGS. 9A-9C illustrate a helmet in another embodiment of the present disclosure. FIG. 9A shows the integrated cooling helmet 900, while FIG. 9B provides an exploded view of helmet 900. FIG. 9C shows a photograph of a portion of helmet 900. Helmet 900 consists of shell 910 and external attachments on the left side and right side of shell 910. The external attachments contain cooler pads, fan/pump (optional) to suck external air into helmet 900 and towards the cooler pads, channels for water to flow from an external reservoir to cooler pads, wicking mechanisms, etc., as noted below. In the interest of conciseness, air pathways inside helmet 900 are not shown, but are deemed to be present. The air pathways can be created in a manner similar to that noted above with respect to helmet 150 and/or helmet 800.

In FIG. 9A, only attachment 903L on the left side of the helmet is visible. In FIG. 9B, components/parts of each of the attachments are shown. Attachment 903L includes parts 901L, 902L and 906L. Attachment 903R includes parts 901R (not visible), 902R and 906R. The parts of each attachment have identical features and functions. Thus, parts 901R, 902R and 906R are identical in features, shape and functionality to parts 901L, 902L and 906L respectively. Although two attachments are shown in FIG. 9B, in an alternative embodiment only one attachment with cooling mechanism is implemented. Although not shown, shell 910 may consist of an inner shell and an outer shell, as illustrated with respect to helmet 150 of FIG. 1.

In FIG. 9B, part 904 is a reservoir for storing a liquid (e.g., water). Reservoir 904 is a unit separate from attachments 903L and 904L (rather than contained within the attachment as with helmet 800 of FIGS. 8A-8F), and is shown positioned at the front of helmet 900. Reservoir 904 is attachable to shell 910, and can be considered as another attachment. Part 905 is a compartment between reservoir 904 and a cooler pad (906 shown in FIG. 9C), and includes a simple locking mechanism (905b). Locking mechanism 905b, when engaged, blocks flow of the liquid out of reservoir 904 via the channel and to cooling pad 906, thus preventing any inadvertent spillage of the liquid. This may be particularly important when the helmet is not in use, and enables the user to keep the helmet in any storage position (for example, hanging inverted from the handlebar of a motorcycle) without causing the liquid to spill. The cooling mechanism in helmet 900 is similar in principle to that described above with respect to helmet 800.

In FIG. 9B, 901L represents an inlet for external air to flow into attachment 903L. Part 902L represents a flap that is used to cover vent 901L, and which can be opened to allow external air to flow into inlet 901L. Part 903L helps attach part 904L to shell 910.

The mechanism used to wet the cooler pads 906 is described in more detail now with respect to FIG. 9C. Tunnel 908 (which represents a channel for the liquid to flow from reservoir 904 to cooler pad 906) connects water reservoir 904 (also shown in FIG. 9B) with cooler pad 906. The mechanism to attach reservoir 904 to shell 910 is not shown in FIG. 9C. Tunnel 908 is filled with wicking material (some of which is identified by arrow 907). The wicking material is in contact with cooler pad 906. The liquid from reservoir 904 wets the wicking material in tunnel 908, which in turn wets cooler pad 906. Alternatively, instead of the wicking material, a pump can be used to force the liquid to flow from the reservoir to the cooler pads.

Figure 10:
FIG. 10 is a diagram illustrating the attachment of a cooling unit to a helmet, in an embodiment of the present disclosure.
Figure 11:
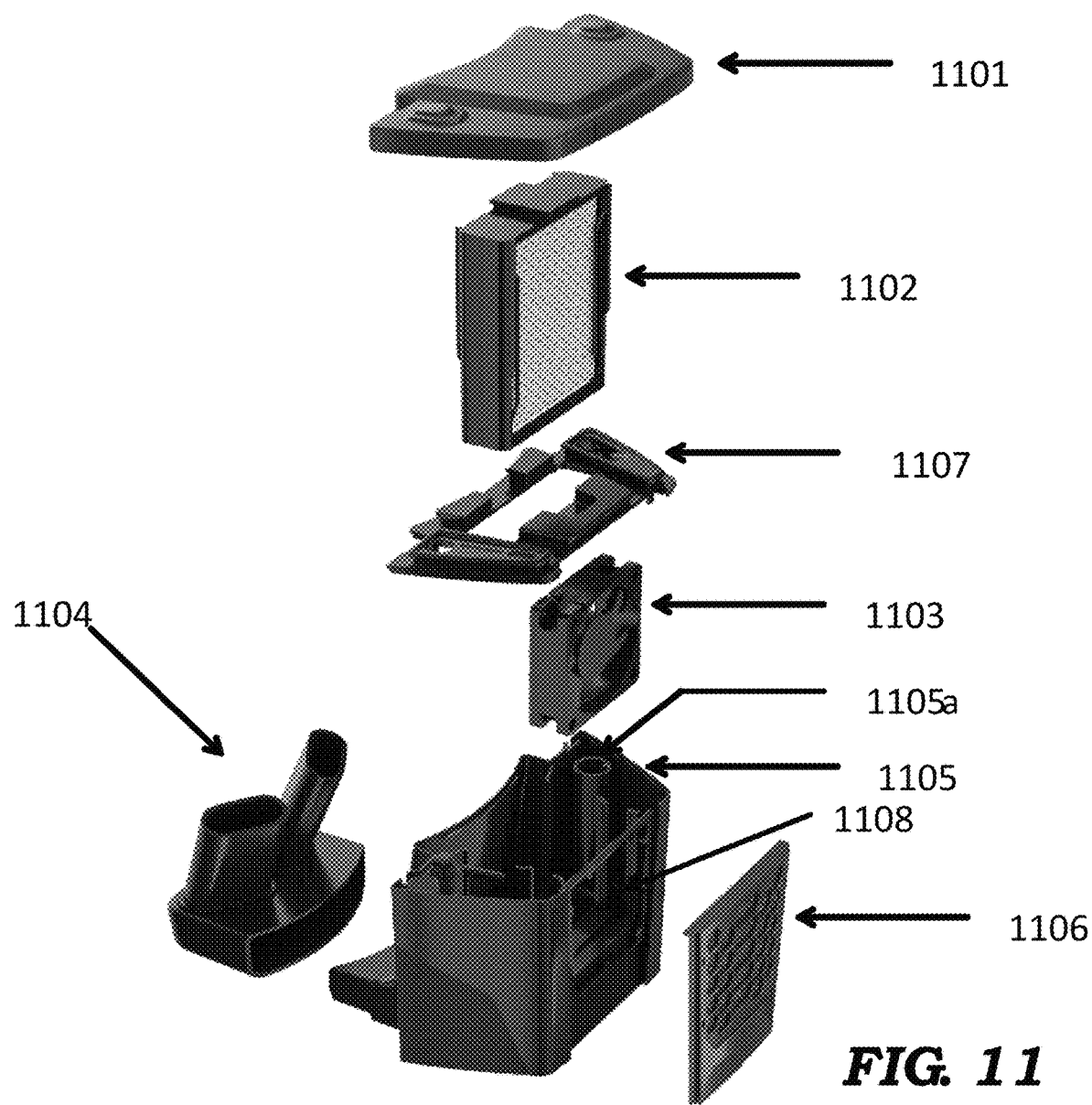
FIG. 11 is a diagram illustrating the various components of a cooling unit, in an embodiment of the present disclosure.

In yet another embodiment of the present disclosure, the cooling unit for cooling the insides of a headgear is easily attachable and detachable by a user of the headgear. The term headgear refers to an object wearable by a user on the head, and may be used for the purpose of protecting the user from injuries to the head. Such headgear may be worn by riders of vehicles and people working in industries such as construction, manufacturing, etc. The embodiment is described with respect to FIGS. 10 and 11. To contrast such an embodiment with that of FIGS. 8A-8F, the external attachment (802) of the embodiment of FIGS. 8A-8F is typically attached to (and integrated with) shell 801 during manufacture or repair, and cannot be attached/detached easily by a user of the helmet. On the other hand, the cooling unit described below with respect to FIGS. 10 and 11 is implemented to be a separate stand-alone unit that can be easily attached and detached by a user (during normal use, such as for example, while on the road) to existing helmets (which may not have in-built cooling mechanisms). Such existing helmets are available for purchase in the market, and may be built to conform to one or more safety standards.

In FIG. 10, headgear 1001 is shown, and includes helmet 1003 and cooling unit 1002. As noted above, helmet 1003 may be an off-the-shelf object that may be available for purchase from helmet manufactures and/or helmet retailers. Cooling unit 1002 is shown attached to helmet 1003 using elastic band 1004. Use of an elastic band (1004) is just one method of attaching cooling unit (1002) to helmet (1003). Other methods such as those using double-sided tape, velcro or any other adhesive mechanism that attaches the cooling unit to the helmet can also be used instead. Further, cooling unit 1002 is shown attached to helmet 1003 at the "chin" region of the helmet. However, the attachment can be made to other regions (e.g., sides) also (for example, if the helmet does not have a chin region), with corresponding orientation of the fan used within the cooler.

FIG. 11 shows the different components of cooling unit 1002 in an embodiment of the present disclosure. The cooling unit contains main housing 1105, which in turn is designed to house fan 1103 and cooling pad 1102. Main housing 1105 contains an air-inlet hole 1108. Component 1106 covers the air-inlet hole 1108, and itself contains one or more air inlets. The combination of main housing 1105 and component 1106, when assembled, thus effectively contains one or more inlets for air to flow into main housing 1105.

When the components of FIG. 11 are assembled, cooling is achieved by fan (1103), which draws in air from the ambient via the inlet holes noted above, and passes (forces) the air through cooling filter/pad (1102). Cooling filter/pad (1102) may be wet by a cooling fluid, such as for example water, and therefore can hold moisture (water or cooling fluid, in general). Passage of the sucked-in air through the cooling pad 1102 cools the air, and the cooled air enters (or is directed to) the inside of helmet 1003 through the air outlet (1104), which is positioned on the inner side of chin region of the helmet when the cooling unit is attached to the helmet.

Main housing (1105) includes an inlet (1105a) for water/cooling fluid. The cooling fluid may be poured in to inlet 1105a, and then stored in a reservoir, not shown, but contained for example in main housing 1105. A suitable channel (not shown) may be provided for flow of the cooling fluid from the reservoir to cooling pad 1102. The cooling fluid is used for wetting the cooling filter/pad (1102). The air outlet 1104 attaches to main housing 1105. Units 1101, 1106 and 1107 are mechanical/aesthetic parts that are needed to complete the mechanical assembly of cooling unit.

Although attachment of the cooling unit to a helmet is illustrated and described above, without loss of generality, such a cooling unit can be attached to caps, construction/safety/sports/military helmets or any other headgear. It is also possible to directly strap on the cooling unit around one's head to keep the face cool. The cooling unit is thus "wearable", and can also be attached to apparel such as caps, jackets, shirts, etc. to provide cooling to the wearer. The cooling unit can be used in combination with a wearable object (including helmets) in general.

3. Conclusion

References throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A headgear comprising:
   a helmet for wearing by a user, said helmet having an upper portion and a lower portion to be respectively positioned at a forehead and a chin of said user when worn by said user; and
   a cooling unit,
   wherein the cooling unit is designed to be attachable to, and detachable from, said lower portion of said helmet by said user of said headgear during use of said headgear by said user,
   wherein said cooling unit comprises:
      one or more inlets;
      a fan for drawing in air into said cooling unit via said one or more inlets;
      a pad to hold moisture to cool the air drawn into said cooling unit to generate cooled air;
      an air outlet to direct said cooled air into said helmet; and
      a reservoir to hold a cooling fluid,
   wherein all of said one or more inlets, said fan, said pad, said air outlet and said reservoir are attached to said lower portion of said helmet when said cooling unit is attached to said lower portion of said helmet, and
   wherein all of said one or more inlets, said fan, said pad, said air outlet and said reservoir are detached from said lower portion of said helmet when said cooling unit is detached from said lower portion of said helmet.

2. The headgear of claim 1, wherein said fan and said pad are housed within a main housing unit of said cooling unit, wherein said air outlet is a separate component connected to said main housing unit.

3. The headgear of claim 2,
   wherein said reservoir is connected to said pad through a channel to allow said cooling fluid to moisten said pad.

4. The headgear of claim 3, wherein said cooling unit is attachable to said helmet by an elastic band.

5. A cooling unit comprising:
   one or more inlets;
   a fan for drawing in air into said cooling unit via said one or more inlets;
   a pad to hold moisture to cool the air drawn into said cooling unit to generate cooled air;
   an air outlet to direct said cooled air out of said cooling unit, and
   a reservoir to hold a cooling fluid,
   wherein said cooling unit is designed to be attachable to, and detachable from, a lower portion of a helmet by a user of said helmet during use of said headgear by said user,
   wherein said helmet has an upper portion and said lower portion to be respectively positioned at a forehead and a chin of said user when worn by said user,
   wherein all of said one or more inlets, said fan, said pad, said air outlet and said reservoir are attached to said lower portion of said helmet when said cooling unit is attached to said lower portion of said helmet, and
   wherein all of said one or more inlets, said fan, said pad, said air outlet and said reservoir are detached from said lower portion of said helmet when said cooling unit is detached from said lower portion of said helmet.

6. The cooling unit of claim 5, wherein said fan and said pad are housed within a main housing unit of said cooling unit, wherein said air outlet is a separate component connected to said main housing unit.

7. The cooling unit of claim 6,
   wherein said reservoir is connected to said pad through a channel to allow said cooling fluid to moisten said pad.

8. The cooling unit of claim 7, wherein the cooling unit is attachable to said helmet by an elastic band.

* * * * *